United States Patent
Reck

(10) Patent No.: US 8,784,557 B2
(45) Date of Patent: Jul. 22, 2014

(54) PAVEMENT OVERLAY MATERIAL AND METHOD

(75) Inventor: Nicholas Reck, Cummings, GA (US)

(73) Assignee: Pavement Surface Coatings, LLC, Mountain Lakes, NJ (US)

( * ) Notice: Subject to any disclaimer, the term of this patent is extended or adjusted under 35 U.S.C. 154(b) by 601 days.

(21) Appl. No.: 13/019,535

(22) Filed: Feb. 2, 2011

(65) Prior Publication Data

US 2011/0189456 A1    Aug. 4, 2011

Related U.S. Application Data

(60) Provisional application No. 61/300,594, filed on Feb. 2, 2010.

(51) Int. Cl.
*C04B 24/00*    (2006.01)
*C04B 24/04*    (2006.01)

(52) U.S. Cl.
USPC ............ 106/644; 106/705; 106/724; 106/823

(58) Field of Classification Search
CPC ................................ C04B 24/00; C04B 24/24
USPC .................................. 106/644, 705, 724, 823
See application file for complete search history.

(56) References Cited

U.S. PATENT DOCUMENTS 3,869,417 A * 3/1975 Ramsay ........................ 524/68
4,407,676 A * 10/1983 Restrepo ........................ 521/54

* cited by examiner

*Primary Examiner* — Paul Marcantoni
(74) *Attorney, Agent, or Firm* — Douglas J. Ryder; Ryder, Lu, Mazzec & Konieczny LLC

(57) ABSTRACT

A mix design for a polymer modified cement pavement overlay is disclosed along with a method of making and using the mix on a variety of pavement substrates. The mix includes a specific dry combination of: finely divided Elotex 2311 and 2322 or 2320 polymers; Type 2 or C144 aggregate or equivalent; Type I/II cement; Type F or Type C fly ash; intermediate length polymer microfibers; plasticizer; (optionally) calcium chloride or equivalent; (optionally) quikrete retarder or equivalent; and water. The mixture is combined and applied to the substrate in depths of about ⅛ to about 1 inch in lifts. The mixture is allowed to cure for 3-4 hours before being returned to traffic. The placed mixture exhibits preferred qualities of substrate adhesion, flexibility, tire friction, and wearability.

6 Claims, 8 Drawing Sheets

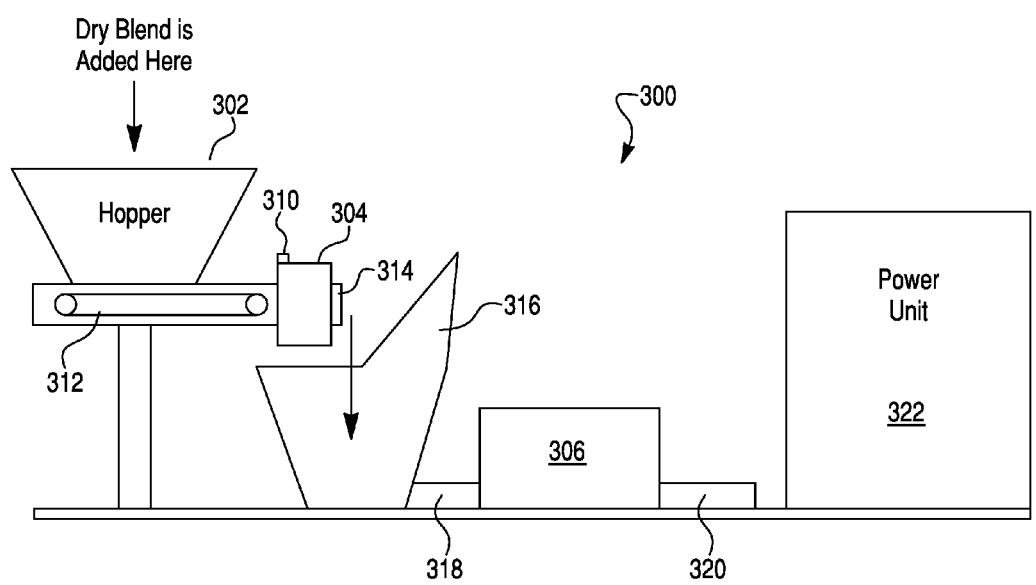

PAVEMENT OVERLAY MATERIAL AND METHOD

This application claims the benefit of prior filed U.S. Provisional Application Ser. No. 61/300,594, filed Feb. 2, 2010.

BACKGROUND OF THE INVENTION

1. Field of the Invention

This invention is directed to a new pavement preservation material that combines fine polymers, cement, fly-ash, aggregate, microfibers and water to form a flexible pavement surfacing overlay that exhibits superior performance, product uniformity, wear, shrinkage and surface friction properties.

2. Background

Most pavement preservation materials are bituminous; however, polymer modified cement materials are also available for use in pavement preservation and service life extension. With an increase in the cost of asphalt, the use of polymer modified cementitious materials have gained more acceptance, and such materials have been more widely used on a variety of road surfaces.

Current polymer modified cementitious materials are typically blended on site and make use of a dry blend of solids and cements, a liquid polymer emulsion and water. The product(s) are widely sold to contractors and combined according to approximate mixture parameters. There is a risk that the amount of the polymer and cement, the most costly mix components, can potentially vary according to the desired level of profitability on the job, rendering the service performance inadequate. Hence, quality, unless strictly controlled or supervised, can vary considerably.

Current polymers used for polymer modified cementitious overlays are mostly acrylic latex polymers which, when mixed with cement and aggregate blends, generate very high air voids. The high air voids will make the product porous. The porous cured product will neither fully protect asphalt surfaces from hydrocarbons, nor prevent the ingress of surface water into the underlying supporting layers. The high air void content (and associated lower density of the placed product) will also result in a product that is more susceptible to wear, abrasion and friction loss.

Further, the polymer modified cementitious materials are installed on a pavement surface, the polymer tends to form a thin polymer film on the surface despite thorough mixing prior to placement. Depending on the ambient temperatures and humidity, the accelerated curing of this thin polymer film can lead to the development of tension cracks as this layer shrinks more rapidly than the underlying mix. The most commonly applied method to reduce the incidence of these crack formations is to simply break the surface tension by spreading a thin layer of sand on the surface. However, this is not well received; firstly, it is a second process that needs to be performed after installing the polymer modified layer; and, secondly, it is very difficult to control the broadcasting of the sand in a single closed traffic lane being overlaid.

Also, to increase the skid resistance of the polymer modified cements, the use of a topically applied sand is usually required. Although increasing the sand content in the mix can also aid in increasing the skid resistance, the current range of polymer modified cement pavement overlay mixtures typically have gap graded sands, i.e., a blend of 2 to 3 specified sizes, which means that the incidence of segregation (the heavier, coarser, sand settling well below the wearing friction surface) prevents the sand from having a significant effect on the surface friction.

The current range of polymer modified cementitious surfacing materials have demonstrated that they are susceptible to even more segregation when necessarily applied in thicker lifts, such as in the wheelpaths that have rutted ½ inch or more, and over cracks that are greater than ¼ inch wide and deep. When the mix has segregated, the larger particles settle to the bottom of the layer, and the fines remain at the top. In addition, when sand segregation does occur, the discontinuous sand profile provides poor flexural performance and cracks form when the layer is subjected to trafficking.

Current polymer modified cementitious surfacing materials are applied during the day to take advantage of sunlight or daylight to help achieve hydration of the cement and therefore allow the road to be opened to traffic within a reasonable timespan. The night time cure times can be as long as 4 to 5 hours depending on the temperature and humidity. Heaters and air blowers have been tried to aid in accelerating the curing process, but such usage is not recommended as the removal of water will reduce the water available for hydration and will weaken the strength aspect contributed by the cement in the mix. This slow cure is difficult to address inasmuch as most commercially available cement accelerators do not work with polymer modified cements.

SUMMARY OF THE INVENTION

The present formulation of a new polymer cement surface overlay mix has been developed to address limitations in the current range of polymer modified cements described above in the background, and each component has been selected and quantified to achieve desired performance properties which are described in detail in the Detailed Description herein.

The present mix includes a specific dry combination of the following components: finely graded polymers; well graded aggregates such as Microsurfacing Type 2 or Type 3 aggregate (sometimes referred to as Type II or Type III aggregates) or C144 aggregates; Type I cement; Type C or Type F fly ash; intermediate length polymer microfibers; and, optionally, accelerators and retarders. The dry mix is delivered to the site and mixed with specified amounts of water. The mixture is mixed until workability is sufficient for application and, thereafter, applied to the substrate in depths of about ⅛ inch to about 1 inch in lifts or layers. The mixture is allowed to cure for about 3 to about 4 hours before being returned to traffic.

The present invention uses commercially available Microsurfacing Type 2 or Type 3 aggregate or C144 aggregate suited to pavement preservation applications in order to provide a well graded aggregate matrix that is not prone to segregate during installation as opposed to more commonly used engineered gap graded prior mix types that are prone to segregate. In addition, by reducing use of the #60 to #120 fine mesh sand in the mix, the dry solid surface area of the aggregate is reduced along with the resultant water requirement necessary to achieve workability. The lower water requirement also reduces the water cement ratio, which ultimately increases the efficiency of the hydration process and therefore increases the short term strength of the inventive mix resulting in a more rapid return to service of the overlaid pavement.

It is an object of this invention to use the larger aggregate fractions, even greater than the 2.65 mm sieve size in the Microsurfacing Type 2 or C144 aggregate gradation, to provide a naturally forming textured surface which will provide skid resistance without having to topically apply aggregate to provide skid resistance.

It is a further object of this invention to use finer aggregate fractions found in mortar sand, to provide a less aggregate textured surface to offer the minimal skid resistance with reduced noise levels.

It is another object of this invention to use the larger aggregate fractions within the well graded aggregate to enable the construction of thicker (but still less than about 1 inch) and internally stable wet and cured lifts in wheelpaths on road surfaces.

It is still a further object of this invention to use a polypropylene (PP) microfiber, preferably about ¼ inch long, to improve the workability of the mix, reduce the incidence of shrinkage cracks in the cured material, which will increase the flexible properties of the cured material, and thereby also reduce the incidence of segregation of the larger aggregate particles while curing.

It is still another object of this invention to use polypropylene microfibers, preferably about 1 inch long, in the mix when the product will be installed in lifts thicker than about ½ inch to increase the flexural strength of the layer, and thereby also reduce its ability to crack under flexure over the long term.

It is still yet a further object of this invention to use a pozzolanic filler that does not exhibit alkali silica reaction tendencies in the dry blend to improve the workability of the mix, reduce the shrinkage of the cured material, and improve the long term strength development of the cured material. A preferred filler is a Type F Fly Ash which improves the resistance of the mix to the development of Alkali Silica Reactivity (ASR) in areas where the local aggregate contains high silica components.

A further object of this invention is to use a dry redispersible polymer, as opposed to a liquid polymer emulsion, to improve the quality control of the product on site. During the conformance and performance testing by independent agencies the dry polymer will allow for a higher level of repeatability in the mixing, applied quality, and testing of the product. Using a dry polymer will also allow the blended product to be delivered to site and simply require the introduction of water only, which simplifies the mixing and placing operation on site.

Still another object of this invention is to use a dry redispersible polymer that has been engineered to allow thin and thick layers of polymer modified layers to be flexible, where liquid polymers have limited flexibility in thicker lifts of polymer modified cement slurries.

Still a further object of this invention is to use a redispersible polymer that also has a defoaming and self leveling action to assist with the reduction of air during the mixing process that is common in prior polymer modified mortars. The reduction of air voids to below 5% is to reduce the permeability and increase the abrasion resistance of the cured material. This polymer is blended with another polymer to ensure that the polymer provides a defoaming action, increases the flexibility of the cured product, and also provides self leveling performance.

Still yet another object of this invention is to provide a polymer to cementitious content ratio of above about 0.15 which is much higher than the ratios proposed for conventional polymer modified mortars. This higher ratio enables the provision of a rapidly cured but highly flexible material. This higher polymer to cementitious content ratio is adopted to allow a higher cementitious content to be used to achieve initial adequate compressive strength (as well as higher full term cure strength), but also allows the product to be pliable to cope with flexible asphalt support surfaces.

A final object of this invention to be expressly recited is to include sufficient cement by total weight of the mix to provide sufficient short term (3 hour) vertical compressive strength to allow a truck tire (100 psi) to traffic the material without deformation.

The present invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

BRIEF DESCRIPTION OF THE DRAWINGS

FIG. 13 is a diagram showing a typical high shear volumetric mixing system for use according to the present invention.

DETAILED DESCRIPTION OF THE INVENTION

Figure 1:
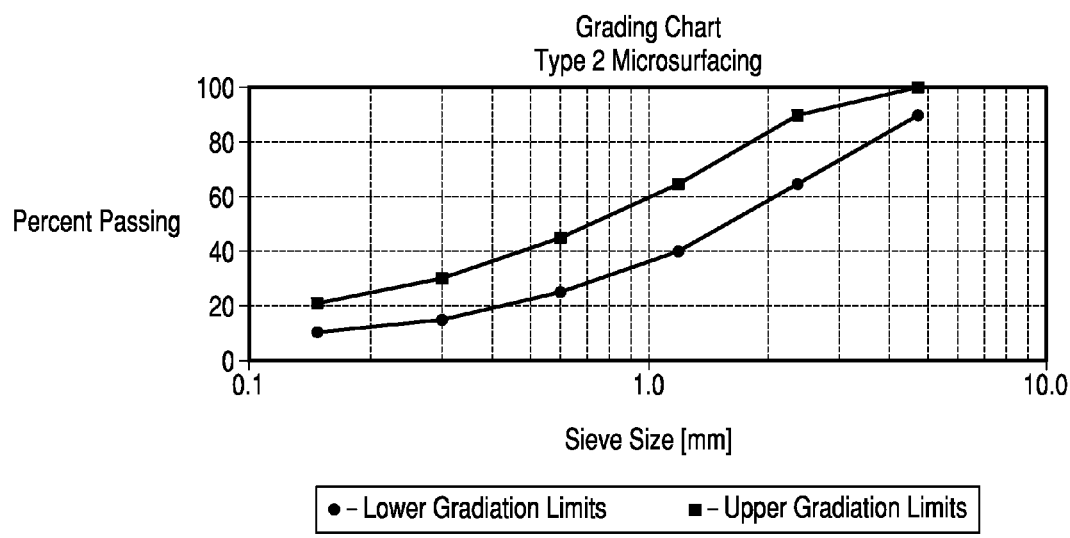
FIG. 1 is a typical grading chart envelope for Type II Microsurfacing or C144 aggregate suitable for use in the invention mixture.

The formulation of the new mix has been developed around the following components. Each component has been selected and quantified to provide certain performance properties which are described in detail below.

TABLE 1

Mix Components, the Proportions and Their Contribution

| Mix Component | Approximate % Range By Weight | Material Type | Desired Performance |
|---|---|---|---|
| Elotex 2211 and either | 0.5-1% | Polymer | Reduced air voids |
| Elotex 2322 | 3-3.5% | Polymer | High flexibility; Strong bond with substrate |
| or Elotex 2320 | 3-3.5% | Polymer | High flexibility; Strong bond with substrate |
| Well graded Type 2 or C144 aggregate, or equivalent | 49-59% | Aggregate | Thickness; Increase skid resistance; Limit segregation; Place thicker lifts or layers |
| Type ½ Cement | 15-25% | Cement | Rapid initial and long term compressive strength gain |
| Type C or Type F Fly Ash | 1-20% | Pozzolanic Filler | Workability; Resists ASR, segregation and shrinkage; Long term compressive strength gain |
| Hardtflow, or equivalent | 0-2% | Plasticizer | Workability, to accommodate lower water to reduce the water:cement ratio |
| Potable Water | 11-21% | Water | Hydrates cement; Improves workability and flowability |
| PP Microfibers (about ⅜ inch to about 1½ inch long) | 0.08-1.16% | Microfibers | Limit segregation; Improves workability; Limits exotherm generation |
| Calcium Chloride, or equivalent | 0%-10% | Accelerator | Accelerate curing process for night time and time constrained projects |
| Quikrete Retarder | 0%-5% | Retarder | Delay the change in workability that comes from adding an accelerator |

The current specifications for Elotex 2211 and 2322 are as follows:

| Type 2322 or Type 2320: | Type 2211: |
|---|---|
| Appearance free-flowing, white powder | Appearance free-flowing, white powder |
| Bulk density 350-650 g/l | Bulk density 440-640 g/l |
| Residual moisture maximum 1.0% | Residual moisture maximum 1.0% |
| Ash TGA 1000° C. 6.0%-10.5% +/− 1.5% | Ash TGA 1000° C. 10.5% +/− 1.5% |
| pH value 6.0-9.0 (as a 10% dispersion in water) | pH value 7.0-8.5 (as a 10% dispersion in water) |
| Min. film building temp. +0° C. | Min. film building temp. + 3° C. |
| Film properties opaque, flexible | Film properties opaque, viscoplastic |

ELOTEX® FX2322, FX2320, and FL 2211 are redispersible binders based on the copolymer of vinyl acetate and ethylene. The protective colloid in each is a polyvinyl alcohol and the powder further includes additive mineral anti-block agents. FX 2320 has slightly higher bulk density (on average) than FX 2322 and a somewhat higher Ash TGA. (FX 2320: Bulk density 450-650 g/l; Ash TGA 1000° C. 10.5%+/−1.5%; FX 2322: Bulk density 350-500 g/l; Ash TGA 1000° C. 6.0%+/−1.5%). These two polymer powders can be used interchangeably in the mixture as noted herein. Type 2211 is used in each version of the mixture.

The components, appearance or properties of these two products could be modified and improvements made over time and therefore should the product, or its code be modified, then it is contemplated that the present invention shall also include the new product specifications or code.

The unique mix target combinations or ratios of the mix components have been developed based on desired performance, field performance observations and laboratory testing and are tabulated in Table 2 below.

TABLE 2

Mix Design Proportions and Ratios

| Component Ratios | Approximate Ratio Range |
|---|---|
| H₂0:Cement | 0.35-0.8 |
| Polymer:Cementitious (includes cement and fly ash) | 0.15-0.3 |
| Polymer:Dry Solids | 0.04-0.07 |
| Cement:Aggregate | 0.25-0.5 |

This invention uses commercially available Microsurfacing Type 2, C144, or equivalent aggregate suited to pavement preservation applications. This aggregate provides a well graded aggregate matrix that is not prone to segregate during installation and cure. The limits of the Microsurfacing Type 2, C144, or equivalent aggregate are shown using the grading envelope in the FIG. 1 Grading Chart. A typical commercially available Type 2, C144, or equivalent aggregate suitable for use in the mix of the present invention is Butler Sand from the Quikrete Companies, Inc., Atlanta, Ga.

This invention enables the use of larger aggregate fractions, up to a maximum of a 9.5 mm sieve size, found in the Microsurfacing Type 2, 89 stone, C33, or C144 aggregate gradations, to provide a naturally forming, during cure, textured surface which will provide skid resistance. The resulting textured surface forms during the curing of the surface and shrinkage or levelling of the top layer of the overlay to conform to the shape of the uppermost underlying aggregate. In addition, the use of the larger aggregate fractions within the well graded aggregate enables the construction of thicker (<1 inch) internally stable lifts in wheelpaths and other depressed areas on the overlaid road surfaces.

This invention uses a polypropylene microfiber, preferably at least ⅜ inch long, to improve the workability of the mix, which reduces the incidence of shrinkage cracks in the cured material and increases the flexible properties of the cured material. The fiber addition also reduces the incidence of segregation of the larger aggregate particles while curing. The use of about 1 inch long polypropylene microfibers in the mix is preferred when the product will be installed in lifts thicker than about ½ inch to increase the flexural strength of the layer and also reduce its ability to crack under flexure over the long term. Commercially available micro fiber materials to meet the foregoing requirements include those from Durafiber Inc., Nashville, Tenn., or equivalent.

This invention uses a pozzolanic filler in the dry blend to improve the workability of the mix, reduce the shrinkage of the cured material, and improve the long term strength development of the cured material. This invention uses a Type C or Type F Fly Ash filler to improve the resistance of the mix to the development of Alkali Silica Reactivity (ASR) in areas where the local Type 2 aggregate or C144 aggregate contain high silica components. Commercially available Fly Ash materials which meet this requirement include Boral Fly Ash available from Boral Material Technologies, Inc., San Antonio, Tex., or an equivalent.

This invention uses a dry redispersible polymer so as to improve the quality control during the mixing of the product on site. A dry polymer will allow the blended mixture to be delivered to the site and simply require the introduction of water only, which simplifies the mixing and placing operation on site. The redispersible polymer also has a defoaming and self leveling action to assist with the reduction of air during the mixing process that is common in polymer modified mortars. The reduction of air improves the impermeability of the surface mix and increases the abrasion resistance of the cured material. This polymer is blended with another polymer that to ensure that the polymer provides a defoaming action, increases the flexibility of the cured product, and also provides self leveling performance. Commercially available polymer materials to meet this requirement include the Elotex products available from Akzo Nobel Functional Chemicals, Brewster, N.Y.

The polymer to cementitious content (including cement and fly ash) ratio of above at least 0.15 enables the provision of a strong but highly flexible material. This high polymer to cement ratio allows a higher cement content to be used to achieve initial adequate compressive strength, but also allows the product to be pliable to cope with the flexible asphalt support surfaces being overlaid. Cement (>15%) by total weight of the mix provides sufficient short term (3 hour) vertical compressive strength to allow a truck tire (100 psi) to traffic the material without deformation and thereby enable a rapid return to service of the travel lane. A pocket penetrometer, shown in FIG. 2, can be used to measure the vertical compressive strength of the curing mix in place, and easily gauge the compressive strength of the thin lift on the road surface at selected intervals during curing. Once the vertical compressive strength registers a strength that exceeds 100 psi, then moderate traffic is allowed onto the surface. Commercially available Type I/II cement materials to meet this requirement include Quikrete® cement available from Quikrete Companies, Inc., Atlanta, Ga., or an equivalent.

Calcium chloride or another suitable accelerator to mix in the foregoing mixture or dissolved, or dispersed in the mixing water could include regular road de-icing coarse granulated materials or an equivalent. The accelerator should either be mixed in the dry blend delivered on site in the proportion noted in Table I, or it should be dissolved in the water prior to adding the dry blend.

Figure 3:
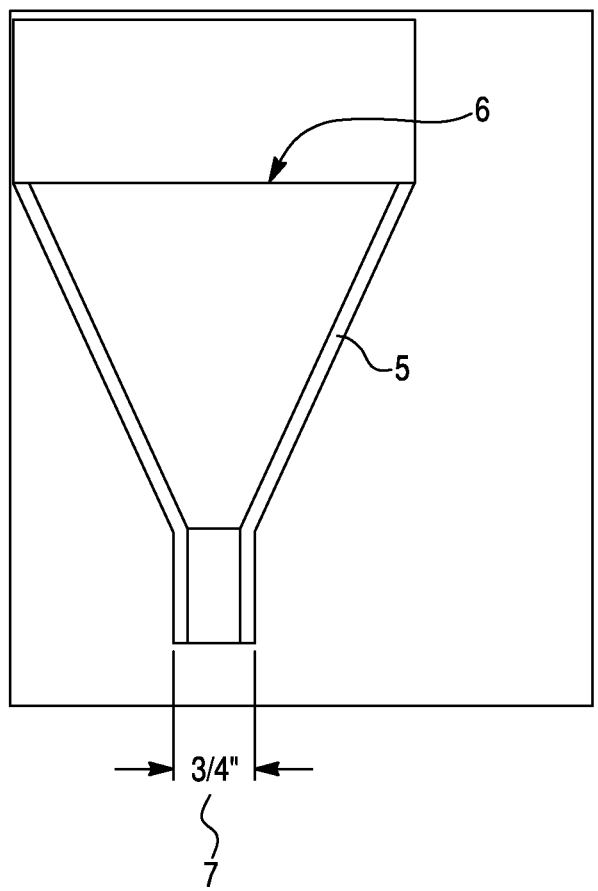
FIG. 3 is a flow meter for testing the invention mixture workability in the field prior to placement.

This invention uses a standard flow cone 5, as shown in FIG. 3, test (ASTM C939) with a ¾ inch spout 7 to measure the flow of the mix. A user fills the cone 5 to fill line 6, and clocks the time for the mix to pass through the spout 7 under gravity. This test is done on site so as to ensure the product consistency/workability and to assure that the product is being mixed in accordance with the specifications and the design. The flow time of the mix through the cone should fall between 25 seconds and 1 minute so as to enable the mix to be mixed and placed without blockage occurring in the placing equipment, such as shown in FIGS. 4-9. The use of an alternative flow device can be allowed, as long as calibration data is available prior to the test.

Application Types

The inventive mixture can be applied over both asphaltic and concrete surfaces as well as other suitable pavements. The product requires only one application of a single lift or layer of material to achieve a wearing surface. If the existing surface is severely spalled, severely textured, or rough, then two successive lifts or layers could be appropriate to achieve a final level surface. If the substrate maintenance design period, remaining structural life, or design interval is less than or equal to 5 years, then such surface is not usually considered a good candidate for the use of the overlay mixture of the present invention.

The following surface types could be considered for use with the overlay composition of the present invention:
   Sealcoats
   Single Chip, Double Chip or Cape Seals
   Type I, Type II or Type III Slurries
   Type I, Type II or Type III Microsurfacings
   Thin hot mix flexible asphalt pavement surfaces with high surface deflections (≥0.8 mm deflection)
   Thick hot mix flexible asphalt pavement surfaces with low surface deflections (≤0.8 mm deflection)
   Unjointed, Jointed, Continuously Reinforced Portland Cement Concrete Pavements, sidewalks, or cycle paths
   Whitetopping
   Roller compacted concrete
   Stamped or Stenciled Cross walks
   Tennis court acrylic surfacings Material Handling The dry solid components of the present invention are delivered to site in bulk bags or other containers. The dry blend materials are plant mixed to a uniform consistency, and delivered to site, preferably, in weatherproof containers and stored in a covered and ventilated location. The water used for mixing the product should preferably be of potable quality and as free as practicable from soluble salts. (This may require pre-treatment or filtering to achieve the desired low level of soluble salts.)

It is preferred that all of the dry solid components, including the aggregate, be mixed together as above described when delivered to site in bulk bags in order to ensure product quality. However, it is also possible that the aggregate component can be separately delivered apart from the other dry solid components to site, and thoroughly mixed with the other solid components at the site before they are added to the water.

The Mixing Procedure

The material is suitable for mixing in small batches using a paddle mixer, portable mortar mixers, seal coat mixing machines or even adapted self propelled high production microsurfacing or slurry vehicles such as those shown in FIG. 4, 5, 9 and as described below.

The materials delivered to a site include a preblended combination of the cementitious components, dry solids and microfibers. The water is first added to the mixing equipment, such as batch mixing machine 10 (shown in FIG. 4) or secondary mixing machine 50 (shown in FIG. 5) and then the dry solids are added incrementally until a smooth mixture is obtained. When mixed together, this blend creates a "slurry" type mixture that when applied to asphalt, concrete and other pavement types forms a continuous thin lift of material on the surface. The mix is blended for a minimum of 5 minutes or instantly using a high shear mixer before placing the material in the pull blade screed device 70 such as that shown in FIG. 6-8.

To add color, the dry pigments can either be preblended with the dry solids or a liquid or dry color additive should be added to the water, before adding the dry solids in the field.

When the ambient temperature exceeds 90° F., then either chilled water (40° F.) should be used or 50% by weight of the water should be replaced by ice cubes from a commercial source.

Where the ambient temperature is less than 50° F., or if night time paving is anticipated, then an "accelerator" and "retarder" blend of additives should be added that is appropriate for the surface being paved. For example, the accelerator calcium chloride ($CaCl_2$) should be used only over asphalt, and not concrete surfaces that have steel reinforcement.

The prescribed flowability testing of the mix for each batch will dictate whether additional water is required. Depending on the size of the batch, if the desired level of flowability is not achieved, then additional water can be added in increments of no more than about 0.5% by weight of the total mix, until the desired level of flowability is achieved. This additional increased amount should be recorded, and the remainder of the batches, should have the water content increased accordingly.

Optimum Placement Conditions

Figure 10:
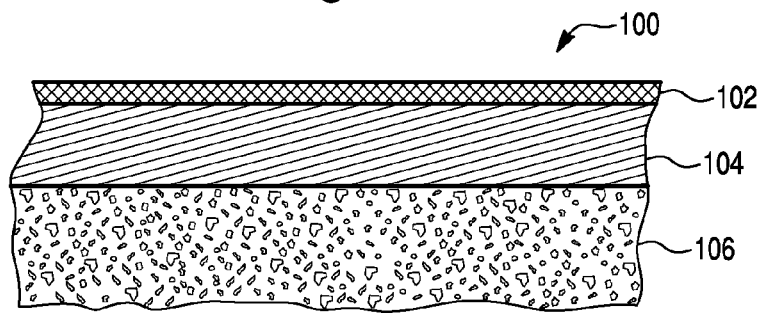
FIG. 10 is a pavement substrate cross section with an overlay according to the present invention.

The mixture of the present invention should not be applied when the surface, such as surface 104 in FIG. 10, is wet or impending weather conditions will not allow for proper curing. When rain appears imminent, placement operations should cease until the threat of rain has passed. In addition, the inventive mixture should not be placed until both the ambient and substrate temperatures are 50° F. (10° C.) and rising and are expected to remain above 50° F. (10° C.) for at least 8 hours. If the ambient temperature exceeds 90° F. (32° C.) the water used in the mix should be cooled to 40° F. (5° C.), and if the temperatures are anticipated to exceed 100° F. (38° C.) then it is recommended that 50% of the weight of the water should be made available in commercially sourced ice cubes.

Application temperatures of the substrate that exceed 130° F. (50° C.) should be closely monitored for performance during the first application of the mixture. Any observable defects such as surface cracking occurring as a result of extreme temperature should be cause for immediate halting of placement operations. It is recommended that if this occurs with the intervention of cooled water or ice, then an additive should be added to slow down the rate of hydration.

Surface Preparation

The area to be surfaced, such as surface 104 in FIG. 10, must be structurally sufficient and should reasonably offer a minimum of 5 years of acceptable serviceability without the new surfacing, for its intended purpose. If the surface is a newly constructed asphalt surface, the surface should be allowed to cure for a minimum of 2 weeks, so that there is no concentration of residual oils (volatiles) on the surface.

As is the case for any overlay product, the surface 104 that is to receive the mixture should be cleaned of sand, dirt, dust, rock, or any other debris that could prevent proper adhesion. The cleaning can be accomplished by power broom, scraping, blowing, pressure washing, ice or other blasting techniques to ensure a clean surface to allow bonding between the mixture surface course and the substrate.

A degreaser, if needed, can be used to thoroughly remove areas of bleeding, excess sealant, oils, fuels, or other contaminants that could prevent proper adhesion. Areas identified as soft, unstable, or otherwise unsuitable for overlay during the cleaning process should be removed to a depth where the substrate is structurally sound and repaired, such as substrate 106 in FIG. 10.

All cracks greater than ¼ inch (6 mm) and less than ¾ inch (19 mm) in width should be cleaned out to remove raveled aggregate, dirt, vegetation, organic matter, and pliable joint sealants. The cracks should be blown out with compressed air to remove any loose debris. Once all the cracks have been cleaned out, the surface should be cleaned in accordance with the methods proposed above to clean the surface. After the crack has been cleaned, a 12 inch (300 mm) wide layer of a self adhesive stress absorbing interlayer 208 can be applied on the surface, spanning the crack. An 18 inch (460 mm) wide layer of the mixture 204/205 should then be installed spanning and following the centerline of the crack. A second layer of the mixture 204/205 should be installed if necessary.

Figure 11:
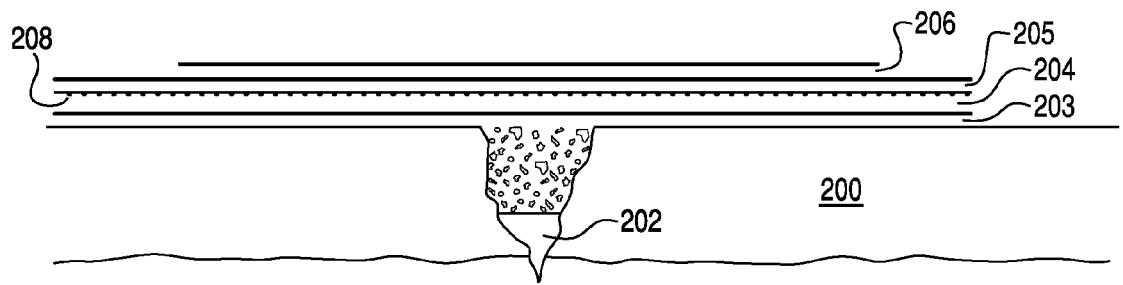
FIG. 11 is a pavement substrate section including a substrate crack pre-treatment according to the present invention.
Figure 12:
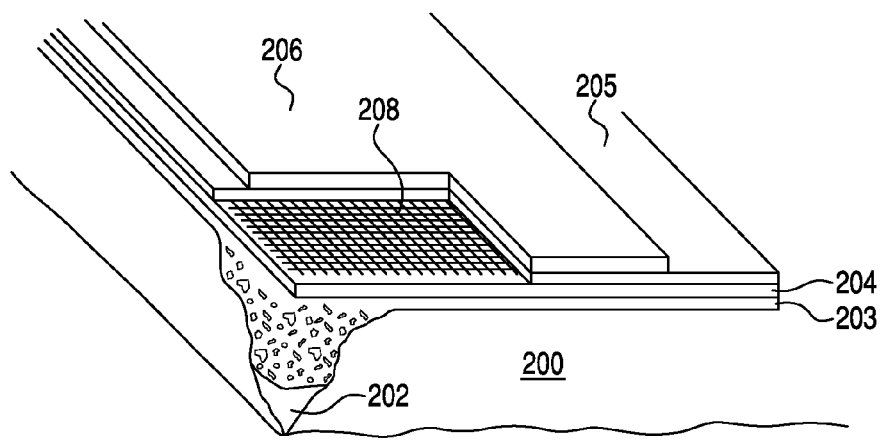
FIG. 12 is a perspective cut-away view of the pavement substrate with overlay section shown according to the present invention.

As shown in FIGS. 11 and 12, if the cracks in substrate 200 are greater than ¾ inch (19 mm) in width, the cracks should be prefilled with an appropriate filler 202/203, which could include the mixture material of the present invention with a larger size aggregate or may comprise an epoxy combination. Once the filler 202/203 has cured, a self adhesive stress absorbing interlayer 208 can be applied on the surface, spanning the filled crack. A layer of the mixture 204/205 should then be installed over and through the self adhesive stress absorbing interlayer 208 to lock/sandwich the interlayer product 208 into place. An additional wearing course 206 of inventive overlay mix, if necessary, can then be applied to smooth the surface.

A 18 inch wide paving mat interlayer strip can be used in place of a self adhesive stress absorbing interlayer 208. To install the paving mat interlayer strip, a layer of the mixture 204/205 should be installed at least 18 inches wide spanning the crack. The paving mat interlayer is then imbedded in the mixture by hand, and then using either a broom or a squeegee, pressure is applied to the mat to remove any wrinkles and to force the mixture to bleed through to the surface. This surface should then be allowed to cure until dry to the touch, and then a second layer of the mixture 204/205 is then applied 18 inches wide using either a 18 inch wide hand operated pull box device or squeegees. A final surface course of the mixture 204/205 can then be applied over the entire pavement on top of this second layer once the lower surface has dried and reached the 100 psi strength.

Placement and Mixing Equipment

It is contemplated that the overlay composition of the present invention can be mixed and applied to the pavement surface to be coated by any suitable equipment.

With reference to FIG. 4-9, the inventive mixture can be mixed, spread, struck-off, and finished in one operation by mechanical methods. The mechanical device(s) are preferably a self propelled primary 90 or secondary mixing and extrusion machine 50. Conventional mechanical devices that can mix and place a single 3,000 LB tote bag to which is added to the 450 LB of water per tote bag in the mixer are sufficient.

Figure 4:
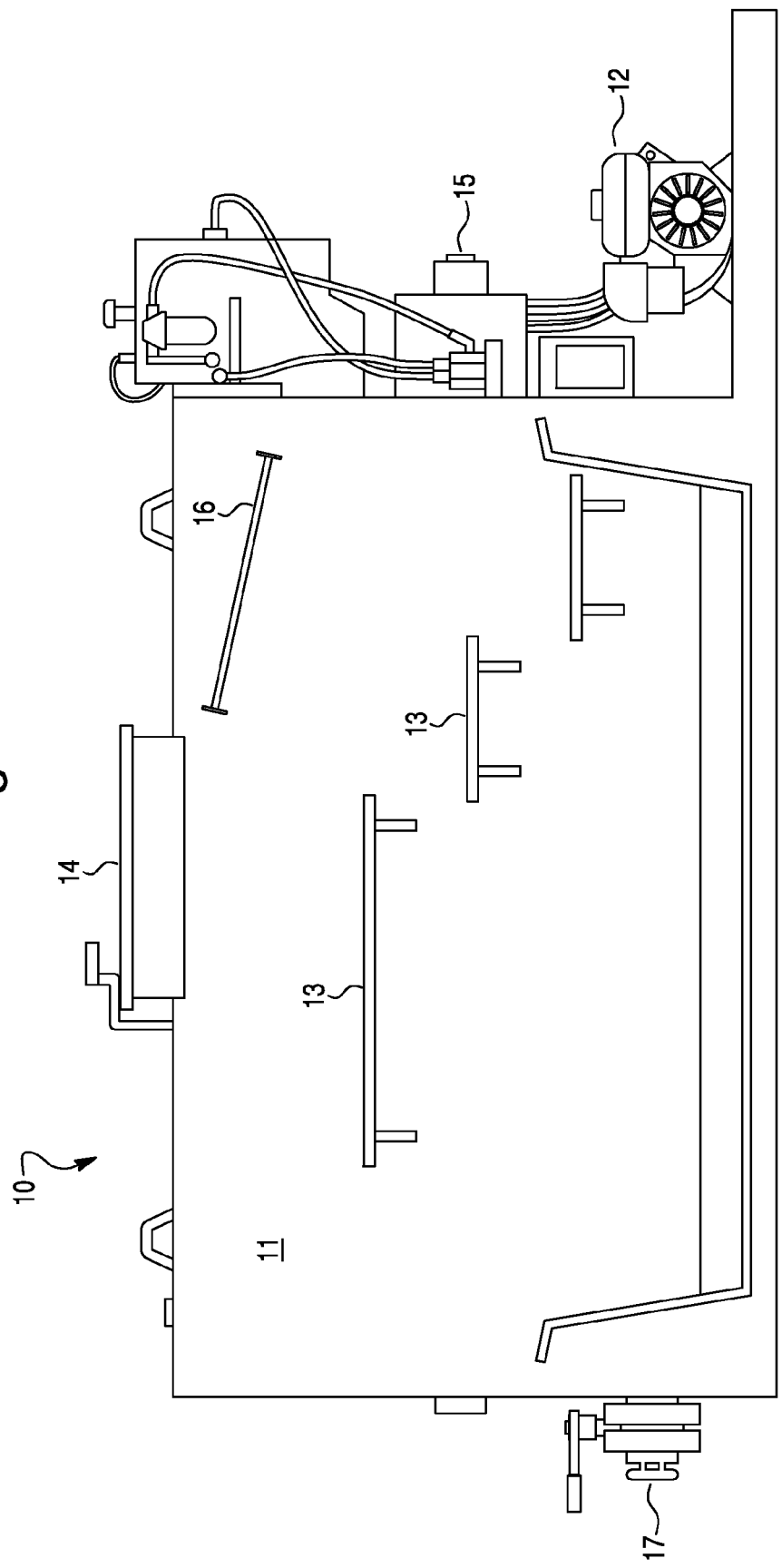
FIG. 4 shows a batch mixer for combining the dry components of the mixture and water on site.
Figure 5:
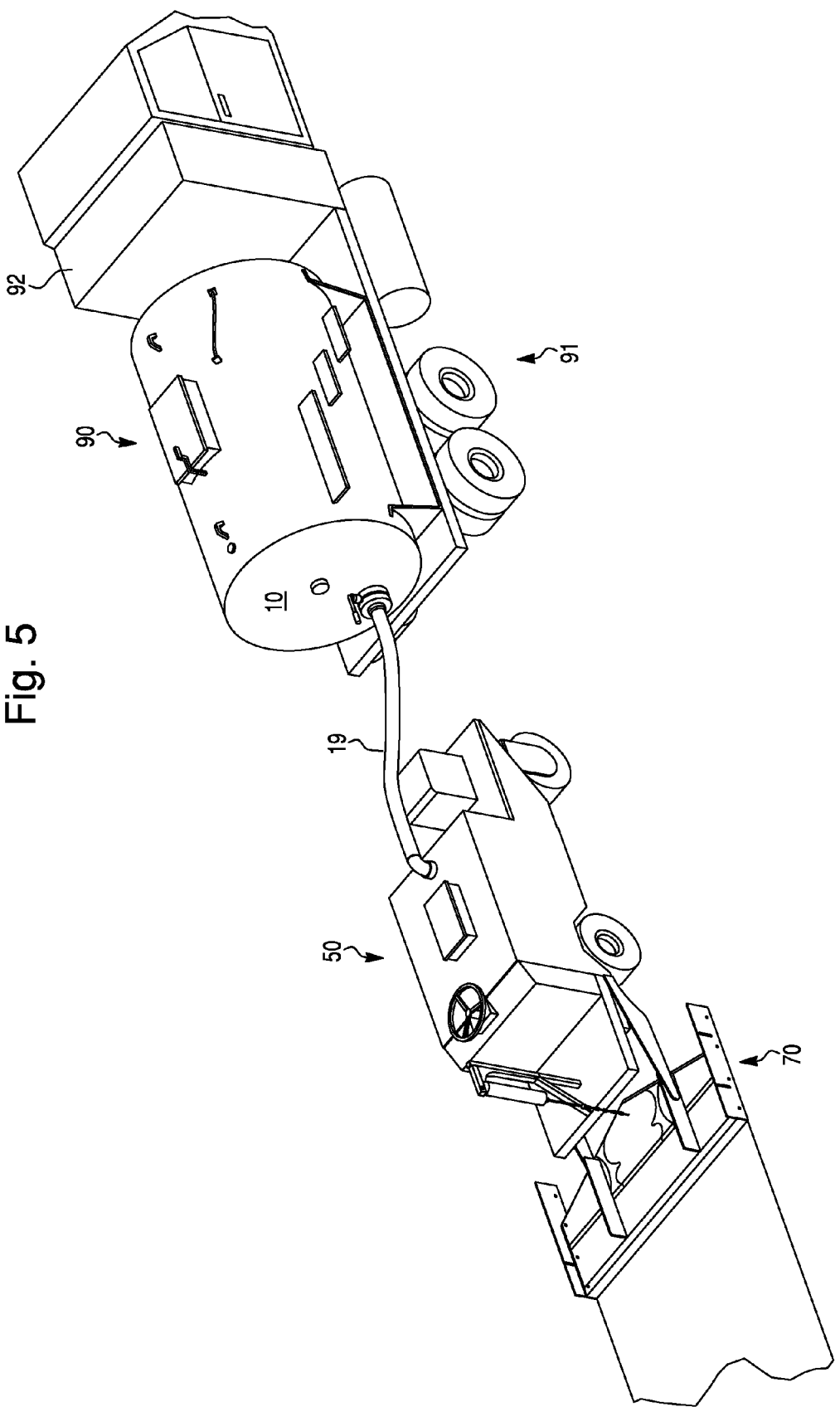
FIG. 5 shows an equipment configuration where a batch mixer feeds a self-propelled mixer/spreader.
Figure 6:
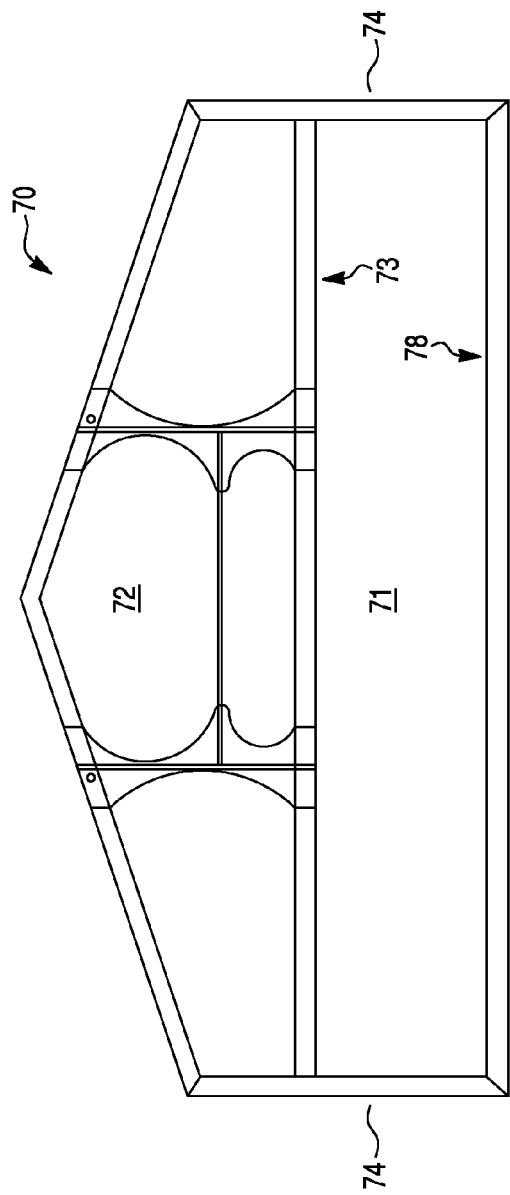
FIG. 6 is a top view showing a 4 chambered screed for depositing the mixture on a pavement.
Figure 7:
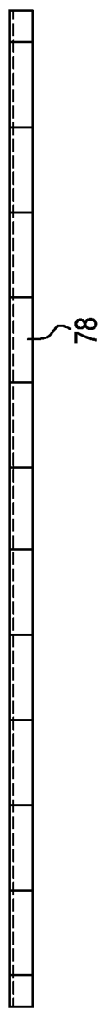
FIG. 7 is a rear elevation view of the screed of FIG. 6, showing the elastomeric rear lip.
Figure 8:
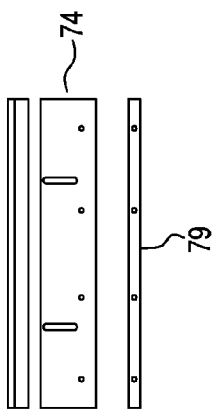
FIG. 8 shows a detail of a height adjustable endplate of the FIG. 6 screed.
Figure 9:
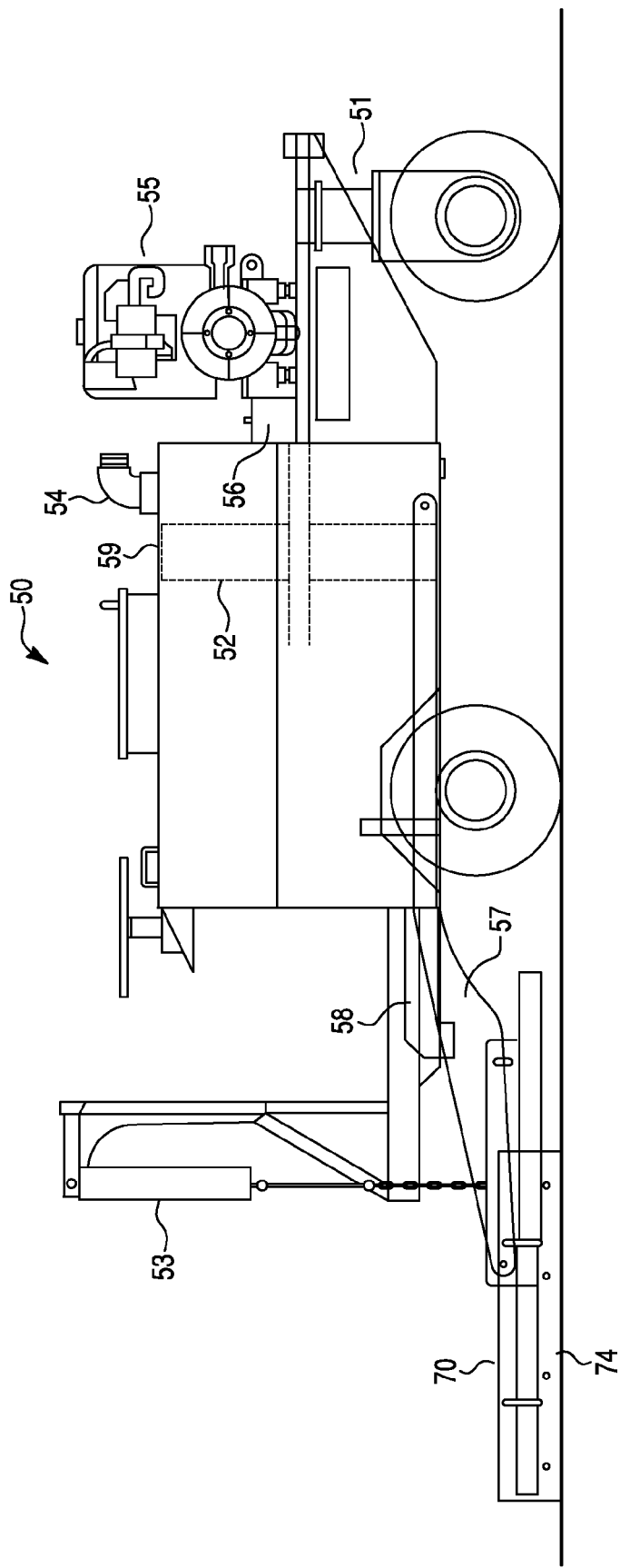
FIG. 9 shows self propelled screed equipped batch mixer/spreader for the mixture.

A mobile 90 or fixed high capacity batch mixing machine (10 as shown in FIG. 4) or high shear volumetric mixer (illustrated in FIG. 13) can be used to produce multiple batches of the inventive mix. The multiple batches can be produced with the aid of either a fixed or mobile crane and/or a forklift. A single batch of dry solids will be provided in a 3,000 LB tote bag which is added to the 450 LB of water per tote bag in the mixer which can be considered a single "kit". A normal job mix is 1 complete kit, and is mixed in the high capacity mixing machine 10 to reduce the loss of materials that could result from delays or sudden changes in ambient weather conditions. The truck mounted crane 92 or forklift lifts each 3,000 LB tote bag of dry solids over the opening 14 at the top of the mixer tank 11 and gravity feeds the dry blend through a valve at the bottom of each tote bag. Water is added to the mixer first, and then the dry mix is added in incremental additions. The mixing can be inspected using steps 13 and hand rail 16 through loading hatch 14. Once a tote bag has been emptied into the agitating mixer 10 driven by motor 12 and shaft 15, the inventive blend is allowed to mix for 5 to 15 minutes prior to discharging through valve 17 and hose 19 to the self-propelled secondary mixer machine 50 for material placement through the drag behind screed 70.

Alternatively, continuous batching can be also be achieved for the present invention by using a conveyor 312 fed high shear volumetric mixer system 300, as shown in FIG. 13, with either a high or low dry blend holding capacity hopper 302. The high shear volumetric mixer 300 system combines a high shear continuous mixer 304 to mix the material, a sump with agitator 316 to receive the mixture, and a hydraulic squeeze pump 306, or equivalent, to distribute the materials for placement. These components in FIG. 13 can be installed permanently on a self propelled vehicle or on a rigid frame that can be transferred onto a flat bed vehicle or other means of transportation. Multiple tote bags can either be deposited in the high capacity hopper, or each individual tote bag can be fed individually continuously into the low capacity hopper 302 to a conveyor 312. Water is added 310 by means of a pumping system in the high speed shear continuous mixing chamber 304; the mixture being discharged through valve 314 to surge agitator 316. The blended inventive mix is then either pumped by means of the hydraulic squeeze pump 306 thru pipes 318 and 320 into the drag behind screed 70 (see FIG. 6) behind the vehicle or into the secondary mixer machine 50 (see FIG. 5).

The secondary mixing machine 50 can operate independently from the primary mixer 91 or can be coupled for high volume placements. The secondary mixer 50 is equipped with its own power source 55, mixing shaft 56 and paddles 52. The secondary mixer can receive premixed materials through elbow 54, or can accept water and dry mix through its own loading hatch. Mixed material is discharged through discharge chute 51 to the drag behind screed 70 linked to the machine 50 by drag bars 57. The screed 70 is height adjustable through link 53 and the side elements 74 can be raised and lowered depending on the thickness of the lift of mixture being placed. The screed 70 itself has multiple chambers 72 and 71 to spread and smooth the mixture as it is being placed. The mid-positioned cross member 73 divides the loading chambers 72 and the placing chamber(s) 71. The end plate cross member 78 is preferably equipped with an elastomeric flexible edge, see FIG. 37, to smooth the top surface of the placed material in the same way a spatula spreads cake frosting. Side elements 74 are adjustable by way of clamping bracket 79 and contain the edges of the spread mix into a lift of controllable dimensions.

Mixture Quality Control

To ensure consistent quality control on any job, it is preferred that the mixture be checked during the mixing process to ensure that its consistency is correct. A flow device should be used after 5 minutes of mixing to ensure that the rate of flow through an ASTM flow device, such as the FIG. 3 cone or an equivalent calibrated manufacturer provided flow device, so that uniformity between batches is maintained.

Figure 2:
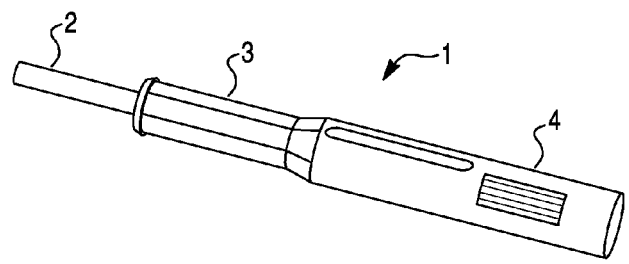
FIG. 2 is a testing device for measuring field compressive strength of the invention mixture during cure.

After the coating mixture has been placed on the pavement and the mixture surface is solid to the touch, the mixture should be checked to ensure that it is strong enough to carry traffic. To ensure that there are no subjectivity risks associated with this decision, a handheld compressive strength device 1, as shown in FIG. 2, should demonstrate that the surface is not marked when the compressive strength is 100 psi or greater for moderate trafficked surfaces. The device 1 includes an extended probe 2 that is placed in contact with the curing mixture. The device 1 is set to an expected testing pressure 3 using a pretensioned spring in handle 4. On every project, it is also recommended that at least 1 set of 9 cube samples should be taken from a randomly selected batch per 500,000 square feet to assess the respective 7, 14 and 28 day strengths of the mix.

The following examples will serve to illustrate the present invention.

Example 1

| | |
|---|---|
| Type I/II Cement | 20% |
| Type "C" Fly Ash | 6% |
| C144 Aggregate | 54% |
| Elotex 2322 | 3% |
| Elotex 2211 | 1% |
| DuraFiber | 0.2% |

Water by Weight of Dry Components 15%

The pre-mixed dry components were delivered in a 3,100 lb bulk bag. The amount of water was calculated, measured and deposited into the mixer unit. The bulk bag was opened, and the contents fed into a Neal 580 mixing machine to evaluate whether the materials can be mixed adequately in machines that are similar in construction. The mix was placed on a parking lot substrate using a pull blade with a 5 mm high fixed level screed to evaluate the surface texture and to determine the approximate yield.

Example 2

| | |
|---|---|
| Type I Cement | 18% |
| Type "C" Fly Ash | 8% |
| Butler Sand | 54% |
| Elotex 2322 | 3% |
| Elotex 2211 | 1% |
| DuraFiber | 0.1% |
| Water by Weight of Dry Components | 16% |

The pre-mixed dry components were delivered in 80 lb bags. The water required for a single bag was calculated, measured and placed into the mortar mixer. A single bag was then opened, and the contents fed into a portable mortar mixing machine. The mix was observed to see whether the materials can be mixed thoroughly in machines that are similar in construction. After thorough mixing was observed, the process was repeated again with six bags. The water content was calculated and measured for the six 80 lb bags and then placed in the mixer. The six bags were opened and deposited into the mortar mixer. The mix was placed on a tennis court using a 6 foot pull blade with a 5 mm high fixed level screed and soft gum rubber blades to evaluate the surface texture and to determine the approximate yield.

Example 3

| | |
|---|---|
| Type I/II Cement | 20% |
| Type "C" Fly Ash | 20% |
| C144 Sand | 50% |
| Elotex 2320 | 3% |
| Elotex 2211 | 0.7% |
| Hardtflow | 0.07% |
| DuraFiber | 0.13% |
| Water by Weight of Dry Components | 15% |

The pre-mixed dry components were delivered in 3,000 lb bags. Five tote bags of pre-mixed dry component were discharged into the high capacity dry goods hopper of a self propelled high volume mixer using a forklift. The vehicle was driven to the location where the material was to be applied to the asphalt surface. The water and dry materials were discharged into the high shear pugmill mixing chamber and mixed until thorough mixing was observed. The water content was determined based on trials performed off site and then regulated with the water meter on the vehicle and flow testing. The mix was placed on the asphalt apron using a 12 foot adjustable pull blade with a variable height screed and a combination of soft and stiff gum rubber blades to create surface texture. The flow was checked at the beginning of each pull, and the water was only adjusted when the measured flow was too low. Once the dry goods hopper was empty, the vehicle was sent to the cleaning bay where the mixing chamber and the pull blade were rinsed with water. Then the vehicle dry goods was replenished with a further 5 tote bags and the installation was repeated.

While the present invention has been described above in terms of specific embodiments, it is to be understood that the invention is not limited to these disclosed embodiments. Many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

The invention claimed is:

1. A polymer modified cement pavement overlay mixture, comprising by weight:
   a redispersible binder based on a copolymer of vinyl acetate and ethylene formulated to improve workability and void distribution, about 0.5 wt % to about 1.0 wt %;
   a redispersible binder based on a copolymer of vinyl acetate and ethylene formulated to improve cured state flexibility and adhesion with a substrate, about 3.0 wt % to about 3.5 wt %;
   masonry mortar aggregate (ASTM C144) about 49 wt % to about 59 wt %;
   type II hydraulic Portland cement about 15 wt % to about 25 wt %;
   class C or class F fly ash about 1 wt % to about 20 wt %;
   polycarbonate superplasticizer about 0 wt % to 2 wt %;
   polypropylene microfibers, about 0.25 to about 1.5 inches long, about 0.8 wt % to about 1.16 wt %; and
   water about 11 wt % to about 21 wt %.

2. A mixture as in claim 1, further comprising:
   calcium chloride about 0.01 wt % to about 10 wt % blended with a retarding admixture (ASTM C494 Type B) about 0 wt % to about 5 wt %.

3. A method of making a pavement overlay mixture, comprising the steps of:
   combining
      a redispersible binder based on a copolymer of vinyl acetate and ethylene formulated to improve workability and void distribution, about 0.5 wt % to about 1.0 wt %;
      a redispersible binder based on a copolymer of vinyl acetate and ethylene formulated to improve cured state flexibility and adhesion with a substrate, about 3.0 wt % to about 3.5 wt %;
      masonry mortar aggregate (ASTM C144) about 49 wt % to about 59 wt %;
      type II hydraulic Portland cement about 15 wt % to about 25 wt %;
      class C or class F fly ash about 1 wt % to about 20 wt %;
      polycarbonate superplasticizer about 0 wt % to 2 wt %; and
      polypropylene microfibers, about 0.25 to about 1.5 inches long, about 0.8 wt % to about 1.16 wt % in a dry form blend;
   adding said dry blend to a mixing machine containing water apportioned as about 11 wt % to about 21 wt %, all said percentages being by weight of said overlay mixture; and
   mixing for more than 5 minutes.

4. A method as in claim 3, further comprising the step of:
   testing said mixture following mixing for flowability in a standard ASTM flow meter cone test such that time required for passthrough is consistently between 5 and 60 seconds.

5. A hardened pavement overlay, comprising:
   a ⅛ to 1 inch thick, screed placed, and 4 hour cured mixture, including by weight prior to placement:
   a redispersible binder based on a copolymer of vinyl acetate and ethylene formulated to improve workability and void distribution, about 0.5 wt % to about 1.0 wt %;
   a redispersible binder based on a copolymer of vinyl acetate and ethylene formulated to improve cured state flexibility and adhesion with a substrate, about 3.0 wt % to about 3.5 wt %;
   masonry mortar aggregate (ASTM C144) about 49 wt % to about 59 wt %;
   type II hydraulic Portland cement about 15 wt % to about 25 wt %;
   class C or class F fly ash about 1 wt % to about 20 wt %;
   polycarbonate superplasticizer about 0 wt % to 2 wt %;
   polypropylene microfibers, about 0.25 to about 1.5 inches long, about 0.8 wt % to about 1.16 wt %; and
   water about 11 wt % to about 21 wt %.

6. A hardened pavement overlay as in claim 5, further comprising by weight prior to placement:
   calcium chloride about 0.01 wt % to about 10 wt % blended with a retarding admixture (ASTM C494 Type B) about 0 wt % to about 5 wt %.

* * * * *